(12) United States Patent
Liu et al.

(10) Patent No.: US 12,323,097 B2
(45) Date of Patent: Jun. 3, 2025

(54) PHOTOVOLTAIC JUNCTION BOX, SOLAR CELL ASSEMBLY, AND SOLAR CELL TOPOLOGY

(71) Applicant: Slenergy Technology (A.H.) Co., Ltd., Chuzhou (CN)

(72) Inventors: Yuesheng Liu, Chuzhou (CN); Jian Zhang, Chuzhou (CN); Jinhao Hou, Chuzhou (CN); Zheng Wu, Chuzhou (CN)

(73) Assignee: SLENERGY TECHNOLOGY (A.H.) CO., LTD., Chuzhou (CN)

( * ) Notice: Subject to any disclaimer, the term of this patent is extended or adjusted under 35 U.S.C. 154(b) by 0 days.

(21) Appl. No.: 18/235,063

(22) Filed: Aug. 17, 2023

(65) Prior Publication Data

US 2024/0396495 A1   Nov. 28, 2024

(30) Foreign Application Priority Data

May 22, 2023   (CN) .......................... 202310596375.8

(51) Int. Cl.
*G05F 1/67* (2006.01)
*H02J 3/38* (2006.01)
(Continued)

(52) U.S. Cl.
CPC ................ *H02S 40/34* (2014.12); *G05F 1/67* (2013.01); *H02J 3/381* (2013.01); *H02M 1/14* (2013.01);
(Continued)

(58) Field of Classification Search
CPC ......... G05F 1/67; H02J 3/381; H02J 2300/24; H02J 2300/26; H02M 1/14; H02S 40/34; H02S 40/36; Y02E 10/56
See application file for complete search history.

(56) References Cited

U.S. PATENT DOCUMENTS

2012/0081934 A1* 4/2012 Garrity .................... H02M 7/46
363/37
2012/0113694 A1* 5/2012 Schill .................... H02M 3/155
307/151
(Continued)

FOREIGN PATENT DOCUMENTS

| EP | 2 857 804 A1 | 10/2013 |
| EP | 2 774 243 B1 | 5/2018 |
| KR | 10-2013-0081944 A | 7/2013 |

OTHER PUBLICATIONS

European Search Report for European Application No. 23193829.1, dated Feb. 23, 2024.

*Primary Examiner* — Levi Gannon

(74) *Attorney, Agent, or Firm* — Birch, Stewart, Kolasch & Birch, LLP

(57) ABSTRACT

A photovoltaic junction box includes a first capacitor, a first conversion circuit, a second conversion circuit, a control unit, an input end, and an output end. The first capacitor is electrically connected to the input end. The first capacitor is configured to filter the alternating current part in a direct current input from an external device. The control unit is separately electrically connected to the first capacitor and the output end and configured to determine the maximum output power point of the external device. The first conversion circuit and the second conversion circuit are connected in parallel and are electrically connected to the control unit. The first conversion circuit and the second conversion circuit are configured to eliminate a ripple current.

16 Claims, 2 Drawing Sheets

(51) Int. Cl.
*H02M 1/14* (2006.01)
*H02S 40/34* (2014.01)
*H02S 40/36* (2014.01)

(52) U.S. Cl.
CPC ........... *H02S 40/36* (2014.12); *H02J 2300/26* (2020.01); *Y02E 10/56* (2013.01)

(56) References Cited

U.S. PATENT DOCUMENTS

| | | | |
|---|---|---|---|
| 2013/0187473 A1* | 7/2013 | Deboy | H02M 7/49 307/82 |
| 2015/0236599 A1* | 8/2015 | Park | H02J 3/381 363/21.17 |
| 2017/0194790 A1* | 7/2017 | Kim | H02J 3/381 |
| 2018/0083530 A1 | 3/2018 | Ueno | |

* cited by examiner

PHOTOVOLTAIC JUNCTION BOX, SOLAR CELL ASSEMBLY, AND SOLAR CELL TOPOLOGY

CROSS-REFERENCE TO RELATED APPLICATION(S)

This application claims priority to the Chinese Patent Application No. 202310596375.8 filed on May 22, 2023, the disclosure of which is incorporated herein by reference in its entirety.

TECHNICAL FIELD

The present application relates to the field of photovoltaic technologies and, in particular, to a photovoltaic junction box, a solar cell assembly, and a solar cell topology.

BACKGROUND

A photovoltaic junction box is a connection apparatus between a solar cell unit array formed by a solar cell unit and a solar charging control apparatus. The photovoltaic junction box is mainly configured to connect and protect a solar photovoltaic assembly. The principle of the photovoltaic junction box is mainly to use the unidirectional conductivity performance of diodes, so that a current can be placed to return to a solar panel.

Maximum power point tracking (MPPT) is designed to detect the generation voltage of a solar cell unit array in real time and trace the maximum voltage and current value (VI). Thus, a system can output at a maximum power. However, the search speed of an existing photovoltaic junction box during MPPT is relatively slow, and the voltage is always in a fluctuating state. Even if the sunlight does not change, the photovoltaic junction box deviates from the maximum power output point by an average of 5%. If the sunlight changes, the loss further increases, causing waste.

SUMMARY

The present application provides a photovoltaic junction box, a solar cell assembly, and a solar cell topology. Thus, the maximum output power point of an external device can be quickly tracked, thereby eliminating the inherent overhead in a traditional algorithm searching process deviating from the maximum power point.

According to an aspect of the present application, a photovoltaic junction box is provided. The photovoltaic junction box includes a first capacitor, a first conversion circuit, a second conversion circuit, a control unit, an input end, and an output end.

The first capacitor is electrically connected to the input end. The first capacitor is configured to filter the alternating current part in a direct current input from an external device.

The control unit is separately electrically connected to the first capacitor and the output end and configured to determine the maximum output power point of the external device.

The first conversion circuit and the second conversion circuit are connected in parallel, and are electrically connected to the control unit. The first conversion circuit and the second conversion circuit are configured to eliminate a ripple current.

Optionally, the photovoltaic junction box also includes a second capacitor and a switch connected in series. The second capacitor and the switch connected in series are connected to the first capacitor in parallel. The second capacitor, the switch, and the first capacitor are electrically connected between the input end and the control unit. The switch is controlled by the control unit.

The switch is configured to, in response to a voltage input from the external device being less than a preset threshold, be turned off, and in response to the voltage input from the external device being greater than or equal to the preset threshold, be turned on. The second capacitor is configured to filter the alternating current part in a direct current input from the external device.

Optionally, the first conversion circuit and the second conversion circuit are each a DC-DC voltage conversion circuit. The difference between a phase of the first conversion circuit and a phase of the second conversion circuit is 180°.

Optionally, the control unit includes a perturbation observation algorithm module and a PLC communication module. The perturbation observation algorithm module is electrically connected between the first capacitor and the first conversion circuit and the second conversion circuit which are connected in parallel. The PLC communication module is electrically connected between the first conversion circuit and the second conversion circuit which are connected in parallel and the output end.

Optionally, the perturbation observation algorithm module is specifically configured to determine the perturbation voltage difference between the maximum power point tracked in the current time and the maximum power point tracked in last two times, determine a perturbation power difference according to the voltage difference, and determine the reference voltage of the maximum power point to be tracked in next two times according to the perturbation power difference, a perturbation step ratio coefficient, an initial perturbation step, and a corrected perturbation step.

According to another aspect of the present application, a solar cell assembly is provided. The solar cell assembly includes at least one solar cell unit array and at least one photovoltaic junction box according to any one of the preceding embodiments.

The output end of a solar cell unit array is electrically connected to the input end of a photovoltaic junction box.

Optionally, the at least one photovoltaic junction box is in one-to-one correspondence with the at least one solar cell unit array.

Optionally, at least two photovoltaic junction boxes are provided, the at least two photovoltaic junction boxes are connected in series.

Optionally, three photovoltaic junction boxes are provided.

According to another aspect of the present application, a solar cell topology is provided. The solar cell topology includes a plurality of solar cell assemblies according to any one of the preceding embodiments. The plurality of solar cell assemblies are connected in series and/or connected in parallel.

According to the technical solutions in the embodiments of the application, a new photovoltaic junction box is designed. The photovoltaic junction box includes a first capacitor, a first conversion circuit, a second conversion circuit, a control unit, an input end, and an output end. The control unit includes a perturbation observation algorithm module and a PLC communication module. The perturbation observation algorithm module can quickly track the maximum output power point of an external device, filters the alternating current part in a direct current input from the external device through the first capacitor, and eliminate a ripple current through the first conversion circuit and the second conversion circuit. Compared with a related photovoltaic junction box, the technical solutions in the embodiments eliminate the inherent overhead in a traditional algorithm searching process deviating from the maximum power point. Further, by using the solar cell assembly formed by the photovoltaic junction box provided in the present application, the photovoltaic junction box can independently optimize a solar cell unit array corresponding to the photovoltaic junction box, automatically match the imbalance between solar cell unit arrays, and improve the voltage detection precision and the voltage sampling speed.

It is to be understood that the content described in this part is neither intended to identify key or important features of the embodiments of the present application nor intended to limit the scope of the present application. Other features of the present application are apparent from the description provided hereinafter.

BRIEF DESCRIPTION OF DRAWINGS

To illustrate the technical solutions in embodiments of the present application more clearly, the drawings used in the description of the embodiments are briefly described below. Apparently, the drawings described below illustrate only part of the embodiments of the present application, and those of ordinary skill in the art may obtain other drawings based on the drawings described below on the premise that no creative work is done.

DETAILED DESCRIPTION

For a better understanding of the technical solutions by those skilled in the art, the technical solutions in embodiments of the present application are described clearly and completely in conjunction with the drawings in embodiments of the present application. Apparently, the embodiments described below are part, not all, of the embodiments of the present application. Based on the embodiments described herein, all other embodiments obtained by those skilled in the art on the premise that no creative work is done are within the scope of the present application.

It is to be noted that the terms "first", "second", and the like in the description, claims, and drawings of the present application are used for distinguishing between similar objects and are not necessarily used for describing a particular order or sequence. It is to be understood that the data used in this way is interchangeable where appropriate so that the embodiments of the present application described herein may also be implemented in a sequence not illustrated or described herein. In addition, the terms "including", "having", or any other variations thereof described herein are intended to encompass a non-exclusive inclusion. For example, a process, method, system, product, or device that includes a series of steps or units may include not only the expressly listed steps or units but also other steps or units that are not expressly listed or are inherent to such a process, method, product, or device.

Embodiment One

Figure 1:
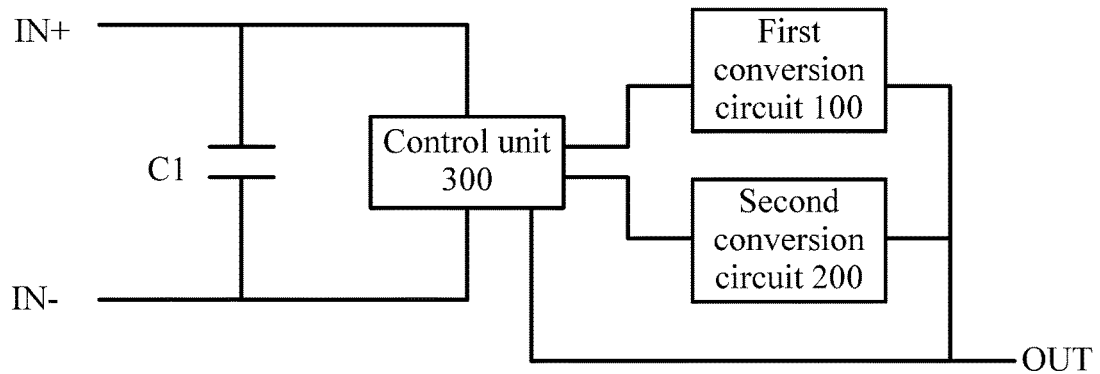
FIG. 1 is a diagram illustrating a structure of a photovoltaic junction box according to embodiment one of the present application.

FIG. 1 is a diagram illustrating a structure of a photovoltaic junction box according to embodiment one of the present application. As shown in FIG. 1, the photovoltaic junction box includes a first capacitor C1, a first conversion circuit 100, a second conversion circuit 200, a control unit 300, an input end IN, and an output end OUT.

The first capacitor C1 is electrically connected to the input end IN. The first capacitor C1 is configured to filter an alternating current part in a direct current input from an external device. The external device is a device that is connected to the input end IN and may be any photovoltaic assembly such as a solar cell assembly.

Generally, the input end IN includes a positive input end IN+ and a negative input end IN−. The first capacitor C1 is electrically connected to the input end IN, referring to that one end of the first capacitor C1 is electrically connected to the positive input end IN+, and another end of the first capacitor C1 is electrically connected to the negative input end IN−.

The control unit 300 is separately electrically connected to the first capacitor C1 and the output end OUT and configured to determine a maximum output power point of the external device.

The first conversion circuit 100 and the second conversion circuit 200 are connected in parallel and are electrically connected to the control unit 300. The first conversion circuit 100 and the second conversion circuit 200 are configured to eliminate a ripple current.

Figure 2:
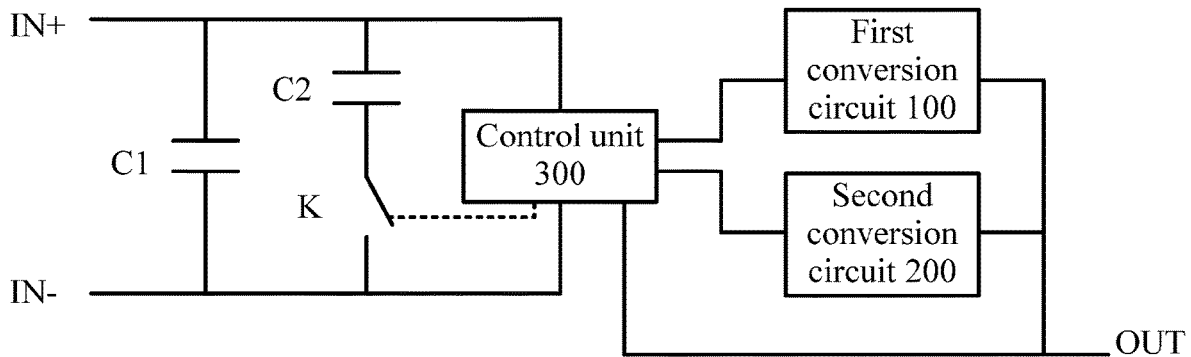
FIG. 2 is a diagram illustrating a structure of another photovoltaic junction box according to embodiment one of the present application.

In an embodiment, based on FIG. 1, FIG. 2 is a diagram illustrating a structure of another photovoltaic junction box according to embodiment one of the present application. As shown in FIG. 2, the photovoltaic junction box also includes a second capacitor C2 and a switch K. The second capacitor C2 and the switch K are connected in series, and the second capacitor C2 and the switch K connected in series are connected to the first capacitor C1 in parallel. The second capacitor C2, the switch K and the first capacitor C1 are electrically connected between the input end IN and the control unit 300. The switch K is controlled by the control unit 300.

In response to a voltage input from the external device being less than a preset threshold, the switch K is configured to be turned off. In response to the voltage input from the external device being greater than or equal to the preset threshold, the switch K is configured to be turned on. The second capacitor C2 is configured to filter the alternating current part in a direct current input from the external device. The value of the preset threshold may be set according to actual requirements.

That is, when the control unit 300 detects that the voltage input from the external device is less than the preset threshold, the control unit 300 controls the switch K to be turned off. In this case, the first capacitor C1 in the photovoltaic junction box is conductive and the first capacitor C1 is configured to filter the alternating current part in a direct current input from the external device. When the control unit 300 detects that the voltage input from the external device is greater than or equal to the preset threshold, the control unit 300 controls the switch K to be turned on. In this case, the first capacitor C1 and the second capacitor C2 in the photovoltaic junction box are conductive, and the first capacitor C1 and the second capacitor C2 are configured to filter the alternating current part in a direct current input from the external device. In this manner, the alternating current part can be filtered according to the actual input voltage value to ensure the filtering effect.

In an embodiment, the first conversion circuit 100 and the second conversion circuit 200 are each a DC-DC voltage conversion circuit. The difference between a phase of the first conversion circuit 100 and a phase of the second conversion circuit 200 is 180°.

Optionally, the switching frequency of the first conversion circuit 100 and the second conversion circuit 200 is 100 KHZ.

Figure 3:
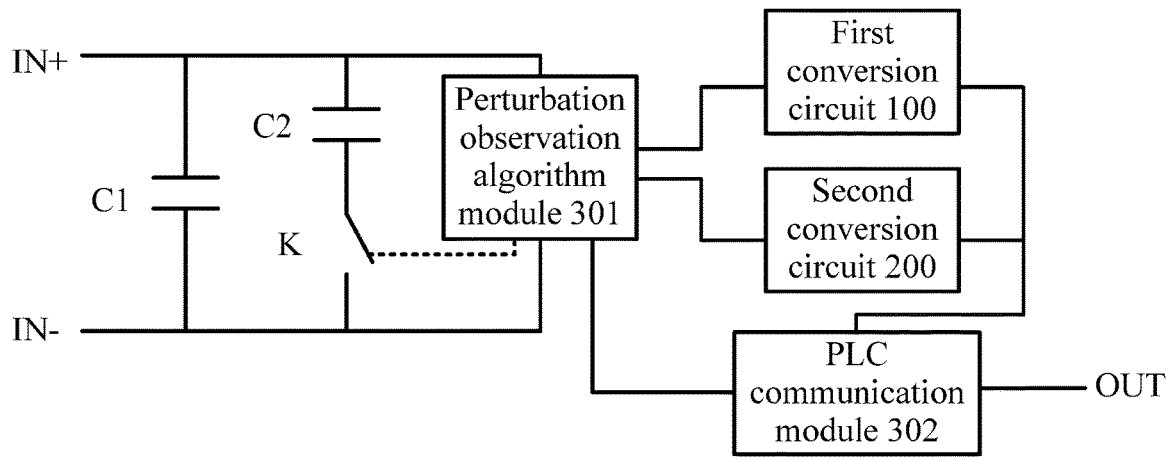
FIG. 3 is a diagram illustrating a structure of another photovoltaic junction box according to embodiment one of the present application.

In an embodiment, based on FIG. 2, FIG. 3 is a diagram illustrating a structure of another photovoltaic junction box according to embodiment one of the present application. As shown in FIG. 3, the control unit 300 includes a perturbation observation algorithm module 301 and a programmable logic controller (PLC) communication module 302. The perturbation observation algorithm module 301 is electrically connected to the first capacitor C1 and the first conversion circuit 100 and the second conversion circuit 200 which are connected in parallel. The PLC communication module 302 is electrically connected between the output end OUT and the first conversion circuit 100 and the second conversion circuit 200 which are connected in parallel.

The perturbation observation algorithm module 301 is specifically configured to determine the perturbation voltage difference between the maximum power point tracked in the current time and the maximum power point tracked in last two times, determine a perturbation power difference according to the voltage difference, and determine the reference voltage of the maximum power point to be tracked in next two times according to the perturbation power difference, a perturbation step ratio coefficient, an initial perturbation step and a corrected perturbation step.

The perturbation observation algorithm module 301 periodically applies two perturbation quantities through software to make the voltage change constantly, constantly corrects a perturbation step and a direction of an inverter according to a perturbation voltage difference and a perturbation power difference that are before and after the perturbation. Thus, the inverter can run at the maximum power point (MPP) under a current condition, thereby ensuring the electric generation and user income of the inverter. The core control principle of the perturbation observation algorithm module 301 is to keep the inverter close to the MPP of a PV (Power Voltage) array and keep the inverter operating normally according to the relationship between the perturbation voltage difference before and after the perturbation and the perturbation power difference before and after the perturbation. In this manner, the perturbation observation algorithm module 301 can free up a voltage detection window of 10 us per second by relying on phase shift and duty cycle management, and fine-tune a voltage approaching the voltage at the maximum output power point to obtain the voltage at the maximum power point by using a preferred variable step convergence method. Each step converges 50%. Each cycle is 200 us. The minimum step after 10 cycles is less than 1 mV.

The embodiments of the present application provide a photovoltaic junction box. The photovoltaic junction box includes a first capacitor, a first conversion circuit, a second conversion circuit, a control unit, an input end, and an output end. The first capacitor is electrically connected to the input end. The first capacitor is configured to filter the alternating current part in a direct current input from an external device. The control unit is separately electrically connected to the first capacitor and the output end and is configured to determine the maximum output power point of the external device. The first conversion circuit and the second conversion circuit are connected in parallel and are electrically connected to the control unit. The first conversion circuit and the second conversion circuit are configured to eliminate a ripple current. A new photovoltaic junction box is designed. The photovoltaic junction box includes a first capacitor, a first conversion circuit, a second conversion circuit, a control unit, an input end, and an output end. The control unit includes a perturbation observation algorithm module and a PLC communication module. The perturbation observation algorithm module can quickly track the maximum output power point of an external device, filters the alternating current part in a direct current input from the external device through the first capacitor, and eliminate a ripple current through the first conversion circuit and the second conversion circuit. Compared with a related photovoltaic junction box, the inherent overhead in a traditional algorithm searching process deviating from the maximum power point is eliminated in the embodiments of the present application.

Embodiment Two

Figure 4:
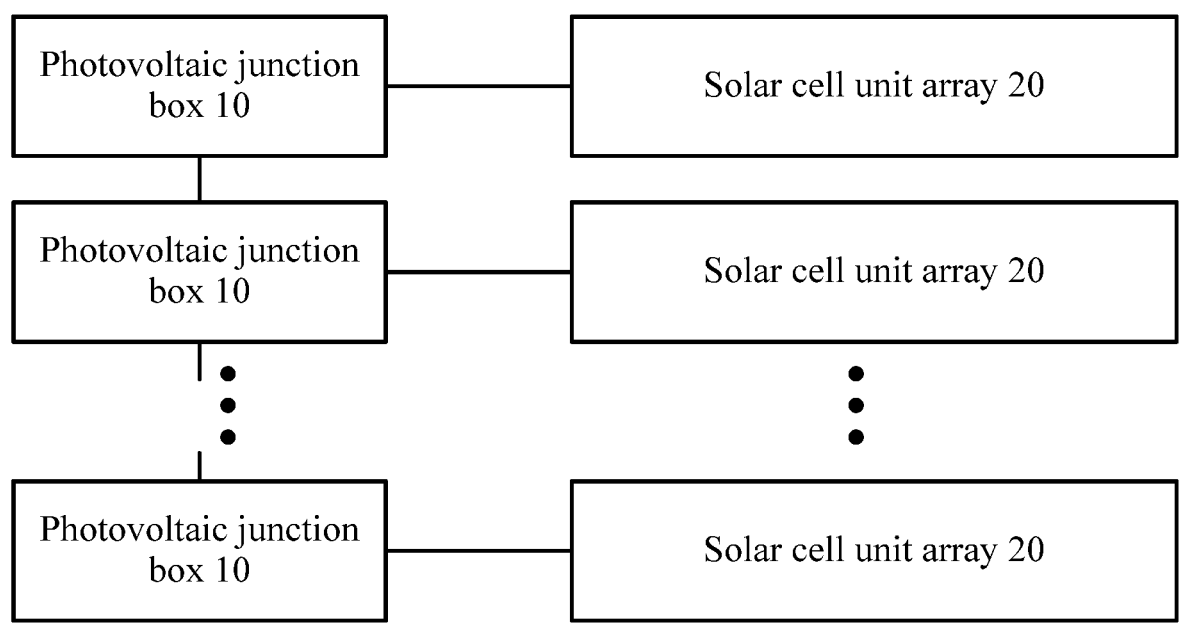
FIG. 4 is a diagram illustrating a structure of a solar cell assembly according to embodiment two of the present application.

FIG. 4 is a diagram illustrating a structure of a solar cell assembly according to embodiment two of the present application. As shown in FIG. 4, the solar cell assembly includes at least one photovoltaic junction box 10 in the preceding embodiment one and at least one solar cell unit array 20. An output end of a solar cell unit array 20 is electrically connected to an input end of a photovoltaic junction box 10.

A solar cell unit array 20 includes multiple solar cell units. The multiple solar cell units are connected in series.

In an embodiment, the at least one photovoltaic junction box 10 is in one-to-one correspondence with the at least one solar cell unit array 20. As shown in FIG. 4, each photovoltaic junction box 10 is connected to one solar cell unit array 20. In this manner, each photovoltaic junction box 10 can optimize the connected solar cell unit array 20 and determine the maximum output power point of each solar cell unit array 20 connected to the respective photovoltaic junction box 10 to automatically match the imbalance of each solar cell unit array 20 in the solar cell assembly. In addition, the at least one photovoltaic junction box 10 is in one-to-one correspondence with the at least one solar cell unit array 20 Compared with a solution in which a related solar cell assembly includes only one photovoltaic junction box, the voltage detection precision and the voltage sampling speed can be increased by N times. N is the number of photovoltaic junction boxes 10.

Certainly, it is to be understood that an increase in the number of photovoltaic junction boxes 10 can increase the production cost of the entire solar cell assembly. Therefore, the embodiments of the present application may also be set as follows: the number of the at least one photovoltaic junction box 10 in one solar cell assembly is greater than 1 and less than the number of solar cell unit arrays 20. In this manner, a portion of the unbalance of each solar cell unit array 20 in the automatic matching solar cell assembly can be retained when saving cost. The beneficial effects of voltage detection accuracy and voltage sampling speed can be improved.

In an embodiment, at least two photovoltaic junction boxes 10 are provided, the at least two photovoltaic junction boxes 10 are connected in series. The photovoltaic junction boxes 10 are connected in series so that the imbalance between solar cell assemblies can be automatically matched.

In an embodiment, three photovoltaic junction boxes 10 are provided.

The embodiments of the present application provide a solar cell assembly. The solar cell assembly includes at least one photovoltaic junction box and at least one solar cell unit array: The output end of a solar cell unit array is electrically connected to the input end of a photovoltaic junction box. A new photovoltaic junction box is designed. The photovoltaic junction box includes a first capacitor, a first conversion circuit, a second conversion circuit, a control unit, an input end, and an output end. The control unit includes a perturbation observation algorithm module and a PLC communication module. The perturbation observation algorithm module can quickly track the maximum output power point of an external device, filters the alternating current part in a direct current input from the external device through the first capacitor, and eliminate a ripple current through the first conversion circuit and the second conversion circuit. Compared with a related photovoltaic junction box, the inherent overhead in a traditional algorithm searching process deviating from the maximum power point is eliminated. Further, by using the solar cell assembly formed by the photovoltaic junction box provided in the present application, the photovoltaic junction box can independently optimize a solar cell unit array corresponding to the photovoltaic junction box, automatically match the imbalance between solar cell unit arrays, and improve the voltage detection precision and the voltage sampling speed.

Embodiment Three

The embodiments of the present application also provide a solar cell topology. The solar cell topology includes multiple solar cell assemblies in the preceding embodiment two. The multiple solar cell assemblies are connected in series and/or connected in parallel. In this manner, the solar cell topology can also implement automatic balance. New and old solar cell assemblies can be used in any combination, so the applicability is wider.

In some embodiments, a method for determining the maximum output power point of an external device may be implemented as a computer program tangibly contained in a computer-readable storage medium. In some embodiments, part or all of the computer program may be loaded and/or installed onto the control unit 300 via an ROM and/or a communication unit. When the computer program is loaded onto the RAM and executed by a processor, one or more steps of the preceding method for determining the maximum output power point of the external device may be executed. Alternatively, in other embodiments, the processor may be configured, in any other suitable manner (for example, by relying on firmware), to execute the method for determining the maximum output power point of the external device.

Herein various embodiments of the systems and techniques described above may be implemented in digital electronic circuitry, integrated circuitry, field-programmable gate arrays (FPGAs), application-specific integrated circuits (ASICs), application-specific standard products (ASSPs), systems on chips (SOCs), complex programmable logic devices (CPLDs), computer hardware, firmware, software, and/or combinations thereof. The various embodiments may include implementations in one or more computer programs. The one or more computer programs are executable and/or interpretable on a programmable system including at least one programmable processor. The programmable processor may be a special-purpose or general-purpose programmable processor for receiving data and instructions from a memory system, at least one input apparatus, and at least one output apparatus and transmitting data and instructions to the memory system, the at least one input apparatus, and the at least one output apparatus.

Computer programs for implementation of the methods of the present application may be written in one programming language or any combination of multiple programming languages. These computer programs may be provided for a processor of a general-purpose computer, a special-purpose computer, or another programmable data processing apparatus such that the program codes, when executed by the processor, cause functions/operations specified in the flowcharts and/or block diagrams to be implemented. The computer programs may be executed entirely on a machine or may be executed partly on a machine. As a stand-alone software package, the program codes may be executed partly on a machine and partly on a remote machine or may be executed entirely on a remote machine or a server.

In the context of the present application, a computer-readable storage medium may be a tangible medium that may contain or store a computer program that is used by or in conjunction with a system, apparatus, or device that executes instructions. The computer-readable storage medium may include, but is not limited to, an electronic, magnetic, optical, electromagnetic, infrared, or semiconductor system, apparatus, or device, or any suitable combination thereof. Alternatively, the computer-readable storage medium may be a machine-readable signal medium. More specific examples of the machine-readable storage medium may include an electrical connection based on one or more wires, a portable computer disk, a hard disk, a random-access memory (RAM), a read-only memory (ROM), an erasable programmable read-only memory (EPROM) or a flash memory, an optical fiber, a portable compact disc read-only memory (CD-ROM), an optical storage device, a magnetic storage device, or any suitable combination thereof.

In order that interaction with a user is provided, the systems and techniques described herein may be implemented on an electronic device. The electronic device has a display apparatus (for example, a cathode-ray tube (CRT) or a liquid-crystal display (LCD) monitor) for displaying information to the user; and a keyboard and a pointing apparatus (for example, a mouse or a trackball) through which the user can provide input for the electronic device. Other types of apparatuses may also be used for providing interaction with a user. For example, feedback provided for the user may be sensory feedback in any form (for example, visual feedback, auditory feedback, or haptic feedback). Moreover, input from the user may be received in any form (including acoustic input, voice input, or haptic input).

The systems and techniques described herein may be implemented in a computing system including a back-end component (for example, a data server), a computing system including a middleware component (for example, an application server), a computing system including a front-end component (for example, a client computer having a graphical user interface or a web browser through which a user can interact with implementations of the systems and techniques described herein), or a computing system including any combination of such back-end, middleware, or front-end components. Components of a system may be interconnected by any form or medium of digital data communication (for example, a communication network). Examples of the communication network include a local area network (LAN), a wide area network (WAN), a blockchain network, and the Internet.

A computing system may include a client and a server. The client and the server are usually far away from each other and generally interact through the communication network. The relationship between the client and the server arises by virtue of computer programs running on respective computers and having a client-server relationship to each other. The server may be a cloud server, also referred to as a cloud computing server or a cloud host. As a host product in a cloud computing service system, the server solves the defects of difficult management and weak service scalability in a related physical host and a related virtual private server (VPS).

It is to be understood that various forms of the preceding flows may be used with steps reordered, added, or removed. For example, the steps described in the present application may be executed in parallel, in sequence, or in a different order as long as the desired results of the technical solutions in the present application are implemented. The execution sequence of these steps is not limited herein.

The scope of the present application is not limited to the preceding embodiments. It is to be understood by those skilled in the art that various modifications, combinations, subcombinations, and substitutions may be made according to design requirements and other factors. Any modifications, equivalent substitutions, improvements, and the like made within the spirit and principle of the present application are within the scope of the present application.

The invention claimed is:

1. A photovoltaic junction box, comprising a first capacitor, a first conversion circuit, a second conversion circuit, a control unit, an input end, and an output end, wherein
the first capacitor is electrically connected to the input end, and the first capacitor is configured to filter an alternating current part in a direct current input from an external device;
the control unit is separately electrically connected to the first capacitor and the output end and is configured to determine a maximum output power point of the external device; and
a second end of the first conversion circuit and a second end of the second conversion circuit are connected to each other, and a first end of the first conversion circuit and a first end of the second conversion circuit are electrically connected to the control unit, and the first conversion circuit and the second conversion circuit are configured to eliminate a ripple current,
wherein the control unit comprises a perturbation observation algorithm module and a programmable logic controller (PLC) communication module, the perturbation observation algorithm module is electrically connected to the first capacitor, the first end of the first conversion circuit and the first end of the second conversion circuit are respectively connected to the perturbation observation algorithm module, and the PLC communication module is electrically connected to the second end of the first conversion circuit and the second end of the second conversion circuit, and electrically connected to the output end, and
wherein the perturbation observation algorithm module is configured to determine a perturbation voltage difference between a maximum power point tracked in a current time and a maximum power point tracked in last two times, determine a perturbation power difference according to the voltage difference, and determine a reference voltage of a maximum power point to be tracked in next two times according to the perturbation power difference, a perturbation step ratio coefficient, an initial perturbation step and a corrected perturbation step.

2. The photovoltaic junction box according to claim 1, further comprising a second capacitor and a switch connected in series, wherein the second capacitor and the switch connected in series are connected to the first capacitor in parallel to form a series-parallel circuit, the series-parallel circuit is electrically connected between the input end and the control unit, and the switch is controlled by the control unit; and
the switch is configured to: in response to a voltage input from the external device being less than a preset threshold, be turned off, and in response to the voltage input from the external device being greater than or equal to the preset threshold, be turned on; and
the second capacitor is configured to filter an alternating current part in a direct current input from the external device.

3. The photovoltaic junction box according to claim 1, wherein the first conversion circuit and the second conversion circuit are each a DC-DC voltage conversion circuit, and a difference between a phase of the first conversion circuit and a phase of the second conversion circuit is 180°.

4. The photovoltaic junction box according to claim 2, wherein the control unit is configured to detect the voltage input from the external device;
in response to the voltage input from the external device being less than the preset threshold, the control unit is configured to control the switch to be turned off, and the first capacitor is configured to be conductive to filter the alternating current part in a direct current input from the external device;
in response to the voltage input from the external device being greater than or equal to the preset threshold, the control unit is configured to control the switch to be turned on, the first capacitor and the second capacitor are configured to be conductive to filter the alternating current part in a direct current input from the external device.

5. The photovoltaic junction box according to claim 1, wherein the input end comprises a positive input end and a negative input end, one end of the first capacitor is electrically connected to the positive input end, and another end of the first capacitor is electrically connected to the negative input end.

6. A solar cell assembly, comprising at least one solar cell unit array and at least one photovoltaic junction box, wherein
an output end of a solar cell unit array in the at least one solar cell unit array is electrically connected to an input end of a photovoltaic junction box in the at least one photovoltaic junction box;
wherein photovoltaic junction box comprising a first capacitor, a first conversion circuit, a second conversion circuit, a control unit, an input end, and an output end;
the first capacitor is electrically connected to the input end, and the first capacitor is configured to filter an alternating current part in a direct current input from an external device;
the control unit is separately electrically connected to the first capacitor and the output end and is configured to determine a maximum output power point of the external device; and a second end of the first conversion circuit and a second end of the second conversion circuit are connected to each other, and a first end of the first conversion circuit and a first end of the second conversion circuit are electrically connected to the control unit, and the first conversion circuit and the second conversion circuit are configured to eliminate a ripple current, wherein the control unit comprises a perturbation observation algorithm module and a programmable logic controller (PLC) communication module, the perturbation observation algorithm module is electrically connected to the first capacitor, the first end of the first conversion circuit and the first end of the second conversion circuit are respectively connected to the perturbation observation algorithm module, and the PLC communication module is electrically connected to the second end of the first conversion circuit and the second end of the second conversion circuit, and electrically connected to the output end, and wherein the perturbation observation algorithm module is configured to determine a perturbation voltage difference between a maximum power point tracked in a current time and a maximum power point tracked in last two times, determine a perturbation power difference according to the voltage difference, and determine a reference voltage of a maximum power point to be tracked in next two times according to the perturbation power difference, a perturbation step ratio coefficient, an initial perturbation step and a corrected perturbation step.

7. The solar cell assembly according to claim 6, wherein photovoltaic junction box further comprising a second capacitor and a switch connected in series, wherein the second capacitor and the switch connected in series are connected to the first capacitor in parallel to form a series-parallel circuit, the series-parallel circuit is electrically connected between the input end and the control unit, and the switch is controlled by the control unit; and the switch is configured to: in response to a voltage input from the external device being less than a preset threshold, be turned off, and in response to the voltage input from the external device being greater than or equal to the preset threshold, be turned on; and the second capacitor is configured to filter an alternating current part in a direct current input from the external device.

8. The solar cell assembly according to claim 7, wherein the control unit is configured to detect the voltage input from the external device;

in response to the voltage input from the external device being less than the preset threshold, the control unit is configured to control the switch to be turned off, and the first capacitor is configured to be conductive to filter the alternating current part in a direct current input from the external device;

in response to the voltage input from the external device being greater than or equal to the preset threshold, the control unit is configured to control the switch to be turned on, the first capacitor and the second capacitor are configured to be conductive to filter the alternating current part in a direct current input from the external device.

9. The solar cell assembly according to claim 6, wherein the first conversion circuit and the second conversion circuit are each a DC-DC voltage conversion circuit, and a difference between a phase of the first conversion circuit and a phase of the second conversion circuit is 180°.

10. The solar cell assembly according to claim 6, wherein the input end comprises a positive input end and a negative input end, one end of the first capacitor is electrically connected to the positive input end, and another end of the first capacitor is electrically connected to the negative input end.

11. The solar cell assembly according to claim 6, wherein the at least one photovoltaic junction box is in one-to-one correspondence with the at least one solar cell unit array.

12. The solar cell assembly according to claim 11, wherein at least two photovoltaic junction boxes are provided, and the at least two photovoltaic junction boxes are connected in series.

13. The solar cell assembly according to claim 12, wherein three photovoltaic junction boxes are provided.

14. The solar cell assembly according to claim 11, wherein three photovoltaic junction boxes are provided.

15. The solar cell assembly according to claim 6, wherein the photovoltaic junction box is configured to determine a maximum output power point of the solar cell unit array connected to the respective photovoltaic junction box.

16. A solar cell topology, comprising a plurality of solar cell assemblies according to claim 6, wherein the plurality of solar cell assemblies are connected in series and/or connected in parallel.

* * * * *